(12) United States Patent
Harris

(10) Patent No.: US 11,090,735 B1
(45) Date of Patent: Aug. 17, 2021

(54) PORTABLE DOWELING JIG

(71) Applicant: Robert William Harris, Durham, NC (US)

(72) Inventor: Robert William Harris, Durham, NC (US)

( * ) Notice: Subject to any disclaimer, the term of this patent is extended or adjusted under 35 U.S.C. 154(b) by 0 days.

(21) Appl. No.: 16/875,069

(22) Filed: May 15, 2020

(51) Int. Cl.
*G01B 5/25* (2006.01)
*B23B 47/28* (2006.01)

(52) U.S. Cl.
CPC .............. *B23B 47/288* (2013.01); *G01B 5/25* (2013.01)

(58) Field of Classification Search
CPC .................................. B23B 47/288; G01B 5/25
See application file for complete search history.

(56) References Cited

U.S. PATENT DOCUMENTS

| | | | | |
|---|---|---|---|---|
| 2,260,784 A * | 10/1941 | Morton | .................. | B23B 47/288 408/103 |
| 2,522,400 A * | 9/1950 | Polkosnik | .............. | B23B 47/288 408/104 |
| 2,612,193 A * | 9/1952 | Springer | .................. | B27M 3/28 144/12 |
| 4,093,394 A * | 6/1978 | Adams | .................. | B23B 47/288 408/103 |
| 4,145,160 A * | 3/1979 | Wiggins | ................ | B23B 47/288 408/103 |
| 4,194,861 A * | 3/1980 | Keller | ................... | B23B 47/288 408/109 |
| 4,377,357 A * | 3/1983 | Butera | .................. | B23B 47/288 408/115 R |
| 4,421,442 A * | 12/1983 | Lindblad | ............... | B23B 47/288 408/108 |
| 4,443,138 A * | 4/1984 | Butera | .................... | B23B 47/28 408/103 |
| 5,281,058 A * | 1/1994 | Hill | ....................... | B23B 47/288 408/115 R |
| 5,407,306 A * | 4/1995 | Klapperich | ........... | B23B 47/288 408/115 R |
| 5,407,307 A * | 4/1995 | Park | ..................... | B23B 47/288 408/115 R |
| 5,586,846 A * | 12/1996 | Johns | .................... | B23B 47/288 408/112 |
| 5,782,006 A * | 7/1998 | Erway | ................... | B23B 47/288 269/242 |
| 5,947,652 A * | 9/1999 | Wagner | ................ | B23B 47/288 408/1 R |
| 6,244,795 B1 * | 6/2001 | Fenelon | ................ | B23B 47/288 408/115 R |
| 2006/0072974 A1 * | 4/2006 | Johnson | ................. | B23B 49/02 408/115 R |

(Continued)

FOREIGN PATENT DOCUMENTS

| CA | 2299566 A1 * | 2/1999 | ........... B23B 47/288 |
|---|---|---|---|
| CA | 2886853 A1 * | 10/2015 | ........... B23B 47/281 |

*Primary Examiner* — Yaritza Guadalupe-McCall

(57) ABSTRACT

A portable doweling jig includes a generally cuboidal body comprising four sets of bores that facilitate the drilling of precisely positioned holes into workpieces for receiving standard-sized construction dowels. Despite the absence of moving parts, the present invention accommodates dowels of different diameters, and also workpieces of both standard and nonstandard thicknesses. Furthermore, the present invention makes possible the creation of three types of dowel joints: edge-to-surface, edge-to-edge, and surface-to-surface.

10 Claims, 7 Drawing Sheets

(56) References Cited

U.S. PATENT DOCUMENTS

2011/0305536 A1* 12/2011 Adkins ................ B23B 47/288
    408/1 R
2019/0329329 A1* 10/2019 Schaaf ................ B23B 47/287

* cited by examiner

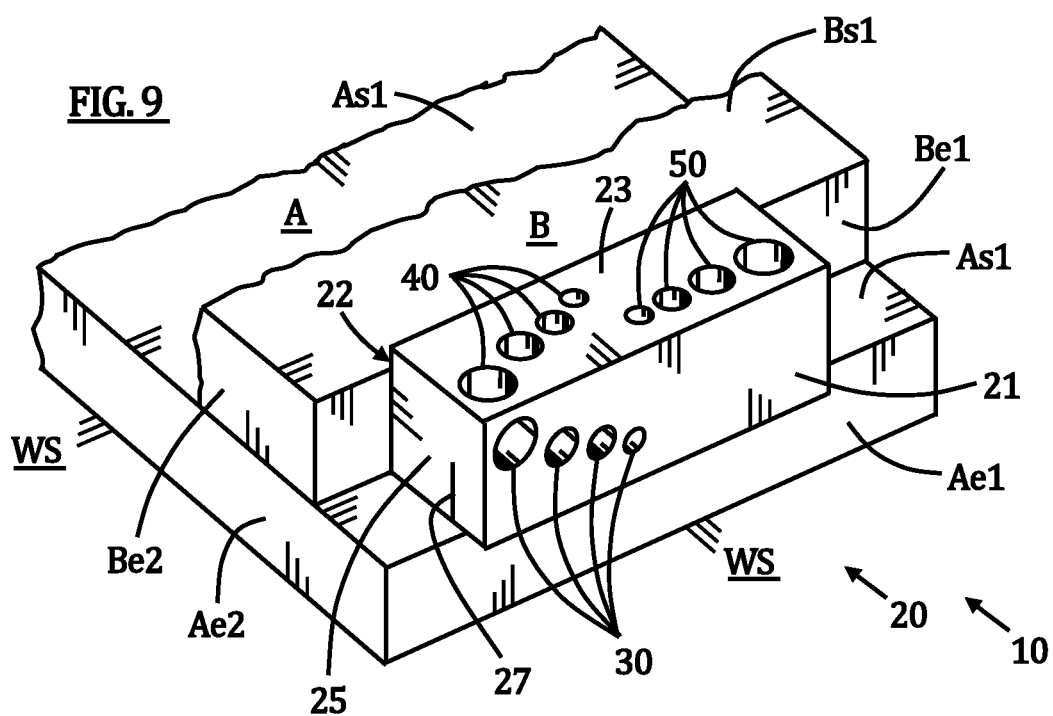

PORTABLE DOWELING JIG

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM

Not applicable.

LISTING COMPACT DISC APPENDIX

Not applicable.

BACKGROUND OF THE INVENTION

Field of the Invention

The present invention relates to doweling jigs, and more particularly to doweling jigs that facilitate the drilling of precisely positioned dowel receiving holes into workpieces so that edge-to-surface, edge-to-edge, and surface-to-surface joints that make use of concealed dowels may be created quickly and easily.

Description of Related Art

Doweling jigs have been used for decades to aid in drilling dowel receiving holes into a pair of workpieces so that the workpieces will align properly when a concealed dowel is used to connect them. The challenging problem of aligning matching dowel receiving holes has prompted a great many solutions. And among the devices that have been disclosed, four primary limitations are evident:

1) Size/weight. Many existing art devices are relatively large and/or heavy, and cannot be carried in a pocket or tool bib. The devices disclosed in U.S. Pat. No. 2,260,784A to Morton, U.S. Pat. No. 5,024,564A to Lloyd, and U.S. Pat. No. 7,726,916B2 to Turner illustrate this limitation.

2) Complexity. Most existing art devices have multiple moving parts and/or removably attached parts, and require cumbersome adjustments and set-up procedures. The device disclosed in US20010036389A1 to Park illustrates this limitation: it incorporates clamping members and guide rods, and requires the use of shim plates to accommodate nonstandard-thickness workpieces. U.S. Pat. No. 5,782,006A to Erway & Brown and U.S. Pat. No. 6,244,794B1 to Lindsay disclose devices that are similar in design and complexity.

3) Imprecision. Some existing art devices lack the precision that is desirable in a doweling jig. For example, the device disclosed in U.S. Pat. No. 6,220,796B1 to Chiang cannot easily be clamped in place when drilling into the edge of a workpiece, so the user must attempt to hold the device steady while drilling through it into the workpiece, a task which is nearly impossible. And with some jigs, the user must rely on judgment to determine exactly where to drill a dowel receiving hole to match a previously-drilled dowel receiving hole. This limitation is apparent in U.S. Pat. No. 7,001,118B1 to Weinstein & Deaton and in EP1277534A1 to Pock'.

4) Limited functionality. Many existing art devices do not aid in the creation of all three standard doweling joints (edge-to-surface, edge-to-edge, and surface-to-surface). The device disclosed in U.S. Pat. No. 4,421,442A to Lindblad illustrates this limitation, and facilitates only the creation of edge-to-edge dowel joints. The devices disclosed in U.S. Pat. No. 3,674,376A to Silken and U.S. Pat. No. 4,923,340A to Hegedusch use different approaches, but have the same problem. There is clearly a need for a doweling jig that overcomes the limitations apparent in existing art devices, specifically their size and/or weight, complexity, imprecision, and limited functionality.

BRIEF SUMMARY OF THE INVENTION

In accordance with the present invention, applicant provides an improved portable doweling jig that is compact, easy to use, and versatile. It will become apparent from the following description, taken together with the drawings, that the present invention possesses benefits and advantages over known doweling jigs.

OBJECTS OF THE INVENTION

The objects of the present invention are to provide a novel doweling jig that:

1) Makes it possible to drill dowel receiving holes into workpieces at precise locations.

2) Accommodates workpieces of both standard and nonstandard thicknesses.

3) Is small enough and light enough to be carried in a pocket.

4) Is simple and intuitive to use.

5) Enables a user to create dowel receiving holes for three types of dowel joints: edge-to-surface, edge-to-edge, and surface-to-surface.

6) Has no moving parts.

DESCRIPTION OF THE INVENTION

The present invention is a doweling jig that is versatile, pocket sized, simple to use, and inexpensive to manufacture. Ideally the jig has a cuboidal body with front, rear, top, bottom, left, and right surfaces. Four sets of bores formed in the body make it possible for a user to drill precisely-located dowel receiving holes into a pair of workpieces. The result is that when such workpieces are joined with a concealed dowel, the edges and surfaces of the two workpieces fit together as the user desires. Even though the present invention has no moving parts, it accommodates a plurality of dowel sizes, as well as workpieces of both standard and nonstandard thicknesses.

BRIEF DESCRIPTION OF THE SEVERAL VIEWS OF THE DRAWINGS

FIG. 9 shows the device used to create one kind of edge-to-surface joint.

DETAILED DESCRIPTION OF THE INVENTION

Figure 1:
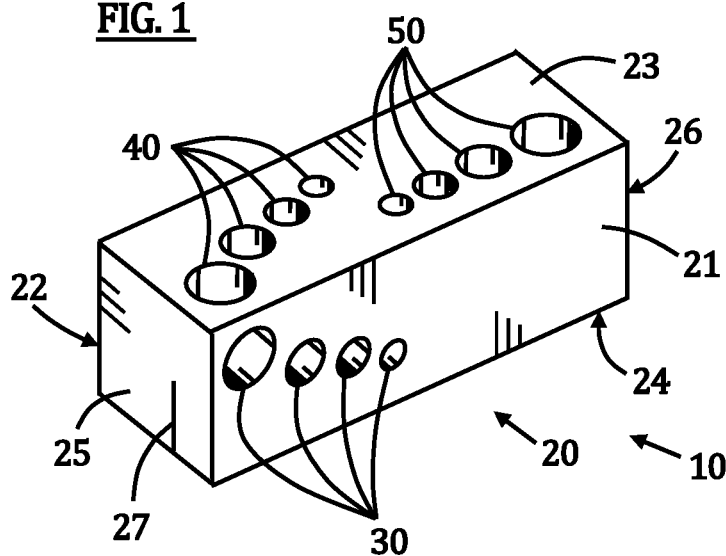
FIG. 1 shows an isometric view of a portable doweling jig embodying the invention.

Referring now to FIGS. 1-12 of the drawings, the portable doweling jig of the invention generally is designated 10. Device 10 comprises body 20, bores 30, bores 40, bores 50, and bores 60.

A detailed description of the structure and function of device 10 in a preferred embodiment will now be set forth.

Body 20

Referring now to FIGS. 1-7, body 20 of device 10 comprises the following:

a) Front surface 21 and rear surface 22, which are essentially parallel to one another, and which are generally rectangular in shape.

b) Top surface 23 and bottom surface 24, which are essentially parallel to one another, and which are generally rectangular in shape.

c) Left surface 25 and right surface 26, which are essentially parallel to one another, which are generally square in shape, and which include guide lines 27 and 28, respectively.

In a preferred embodiment, body 20 is formed from a single piece of material and comprises no moving parts.

Bores 30

Figure 2:
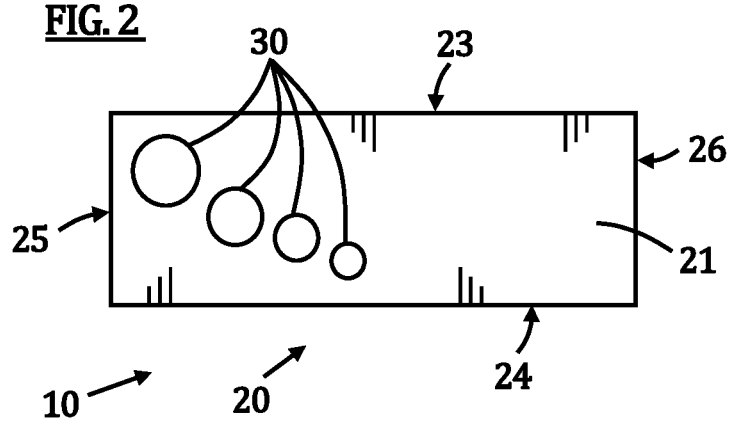
FIG. 2 shows a front elevation of the device.
Figure 3:
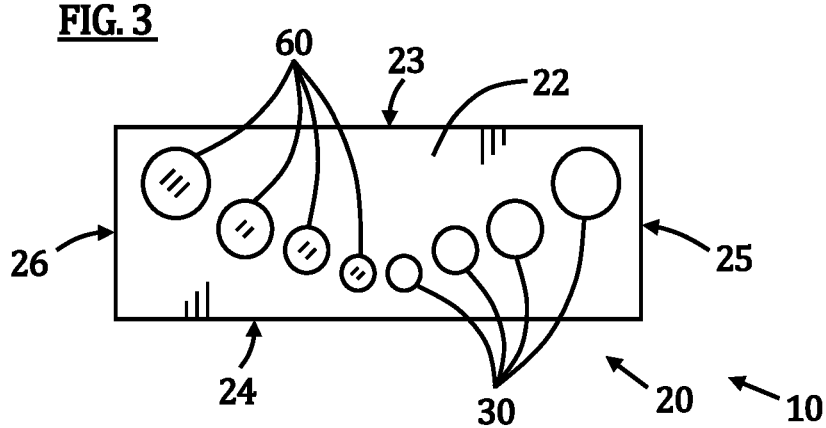
FIG. 3 shows a rear elevation of the device.

Referring now to FIGS. 2 and 3, bores 30 of device 10 are generally cylindrical and parallel to one another. Bores 30 extend between front surface 21 and rear surface 22, and are generally parallel to top surface 23 and bottom surface 24, and also generally parallel to left surface 25 and right surface 26.

The diameters of bores 30 are approximately equal to the diameters of a plurality of standard-sized construction dowels. Furthermore, the positions of bores 30 depend on their diameters, with a relatively large bore 30 being more distant from bottom surface 24 than a relatively small bore 30. More precisely, the center axis of each bore 30 is separated from bottom surface 24 by a distance approximately equal to one-half the thickness of a standard-sized workpiece. This arrangement ensures that appropriately-sized dowel receiving holes can be drilled at or near the center of an edge of a standard-sized workpiece when the workpiece and device 10 rest on a common work surface. For example, a ¼-inch dowel is appropriate for a ¾-inch thick board. So a bore 30 approximately ¼-inch in diameter would have its center axis approximately ⅜-inch from bottom surface 24 (because ⅜ inch is half of ¾ inch).

Bores 40

Figure 4:
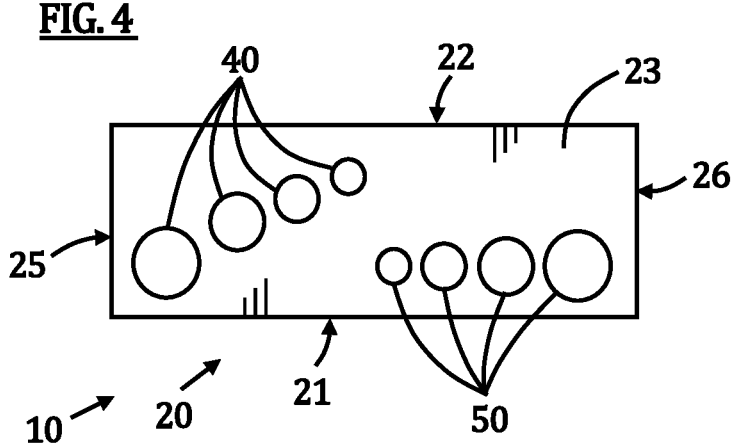
FIG. 4 shows a top elevation of the device.
Figure 5:
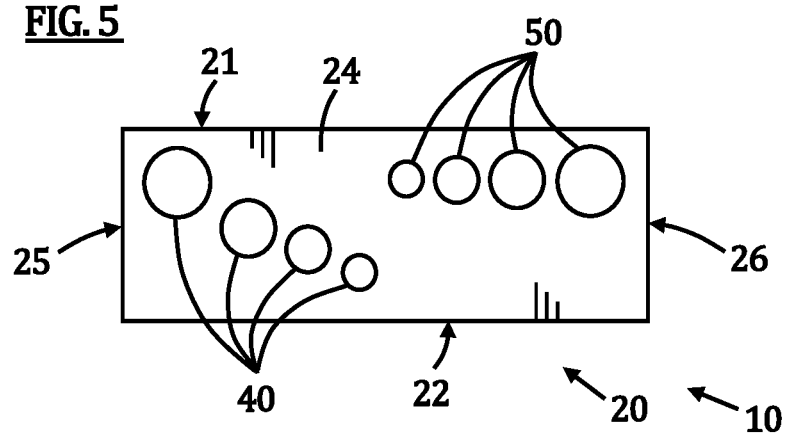
FIG. 5 shows a bottom elevation of the device.
Figure 6:
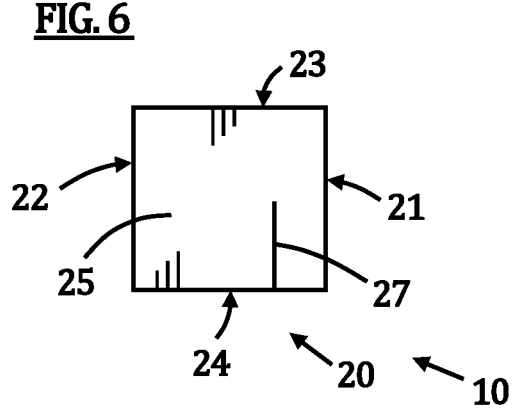
FIG. 6 shows a left elevation of the device.
Figure 7:
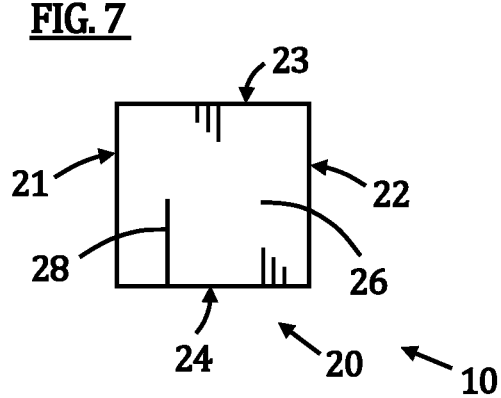
FIG. 7 shows a right elevation of the device.

Referring now to FIGS. 4 and 5, bores 40 of device 10 are generally cylindrical and parallel to one another. Bores 40 extend between top surface 23 and bottom surface 24, and are generally parallel to front surface 21 and rear surface 22, and also generally parallel to left surface 25 and right surface 26.

Each bore 40 has a diameter approximately equal to the diameter of a bore 30. Furthermore, each bore 40 intersects at 90 degrees a bore 30 of approximately equal diameter.

The positions of bores 40 depend on their diameters, with a relatively large bore 40 being more distant from rear surface 22 than a relatively small bore 40. More precisely, a bore 40 and an intersecting bore 30 have center axes that are essentially equidistant from rear surface 22 and bottom surface 24, respectively.

Bores 50

Referring now to FIGS. 4 and 5, bores 50 of device 10 are generally cylindrical and parallel to one another. Bores 50 extend between top surface 23 and bottom surface 24, and are generally parallel to front surface 21 and rear surface 22, and also generally parallel to left surface 25 and right surface 26.

Each bore 50 has a diameter approximately equal to the diameter of a bore 30. Furthermore, the center axes of bores 50 are colinear and equidistant from front surface 21. This arrangement simplifies the use of device 10 and facilitates the precise positioning of device 10 in certain applications (explained below in "Using the Invention").

The center axes of bores 50 align with guide lines 27 and 28 that are formed on left surface 25 and right surface 26, respectively.

Bores 60

Referring now to FIG. 3, bores 60 of device 10 are generally cylindrical and parallel to one another. Bores 60 extend from rear surface 22 toward, but not reaching, bores 50. Bores 60 are generally parallel to top surface 23 and bottom surface 24, and also to left surface 25 and right surface 26.

In a preferred embodiment, each bore 60 has a diameter that is slightly larger than the diameter of a bore 30. This arrangement ensures that device 10 can easily be removably connected to a standard-sized dowel for alignment purposes in certain applications (explained below in "Using the Invention").

The positions of bores 60 depend on their diameters, with a relatively large bore 60 being more distant from bottom surface 24 than a relatively small bore 60. More precisely, a bore 60 and a bore 30 of roughly the same diameter have center axes that are essentially equidistant from bottom surface 24.

The center axis of each bore 60, if extended to front surface 21, intersects at 90 degrees a bore 50 of roughly equal diameter.

Using the Invention

Figure 8A:
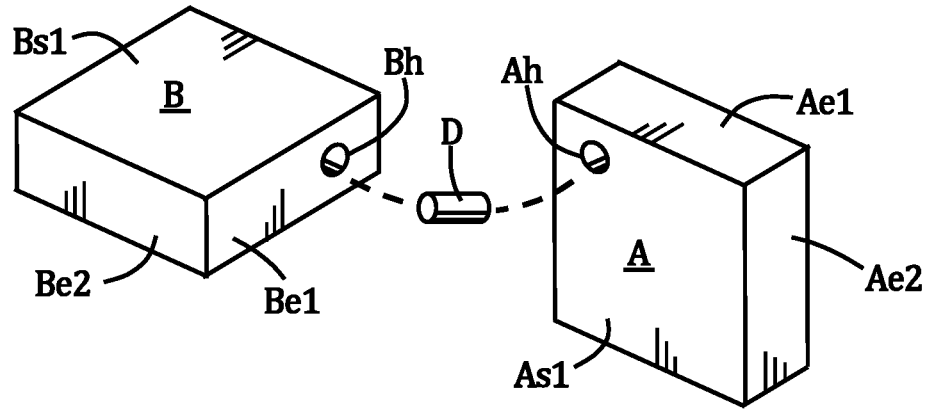
FIGS. 8A, 8B, and 8C show three types of dowel joints that can be created with the device.
Figure 8B:
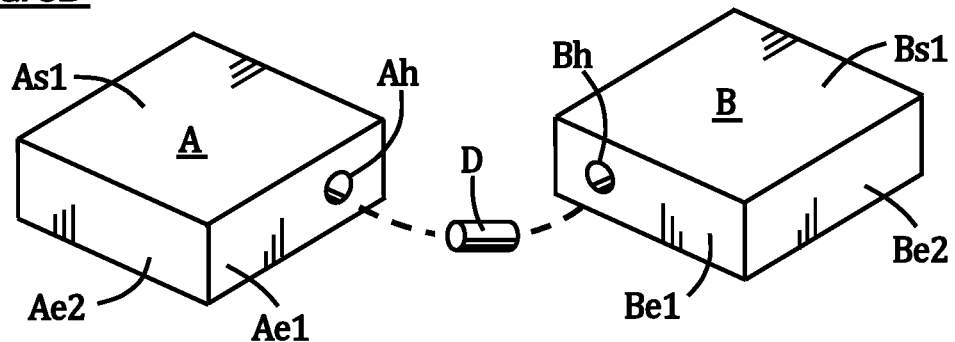
Figure 8C:
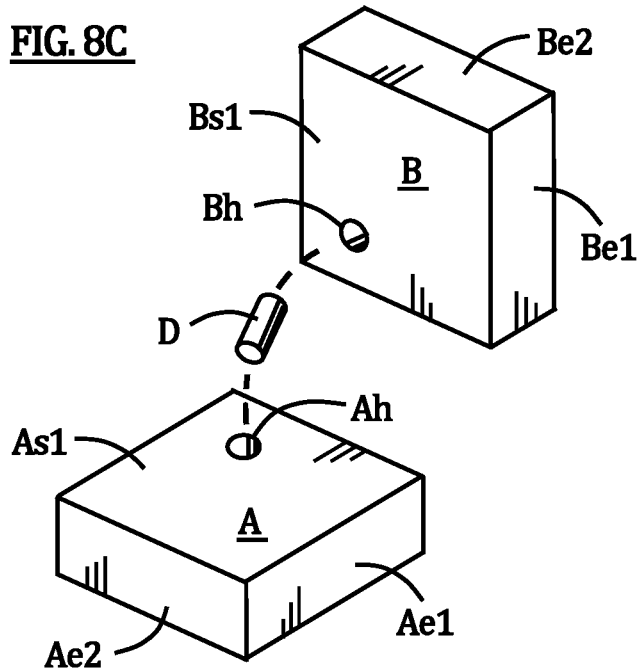

Referring now to FIGS. 8A, 8B, and 8C, device 10 can be used to facilitate the creation of three types of dowel joints with workpieces A and B that are to be joined by dowel D. In the examples, edges Ae1 and Ae2, as well as surface As1, of workpiece A are referenced. Also, edges Be1 and Be2, as well as surface Bs1, of workpiece B are referenced. Dowel receiving holes in workpieces A and B are designated Ah and Bh, respectively.

Three types of joints are illustrated:

1) FIG. 8A shows an edge-to-surface joint, wherein surface As1 abuts edge Be1.

2) FIG. 8B shows an edge-to-edge joint, wherein edge Ae1 abuts edge Be1.

3) FIG. 8C shows a surface-to-surface joint, wherein surface As1 abuts surface Bs1.

Creating Edge-to-Surface Joints

Referring now to FIGS. 8A and 9, a user may create one kind of edge-to-surface joint (wherein surface Bs1 must be flush with edge Ae1) with device 10. Clamps may be used as needed to secure workpieces A and B, as well as device 10, temporarily in desired positions while following these steps:

1. Place workpiece A on work surface WS so that surface As1 faces upward, edge Ae1 faces frontward, and edge Ae2 faces leftward.
2. Place workpiece B on top of workpiece A so that surface Bs1 faces upward, edge Be1 faces frontward, and edge Be2 faces leftward. Position workpiece B so that edge Be1 is separated from edge Ae1 by a distance equal to the thickness of workpiece B, and so that edge Be2 is flush with edge Ae2.
3. Place device 10 on surface As1 so that top surface 23 faces upward and rear surface 22 abuts edge Be1 at a desired position. FIG. 9 shows the arrangement of workpieces A and B, and device 10, at this stage.
4. Drill into surface As1 through a selected bore 40 to create dowel receiving hole Ah (not seen in FIG. 9).
5. Without repositioning device 10, drill into edge Be1 through the bore 30 that intersects the bore 40 used in step 4, thereby creating dowel receiving hole Bh (not seen in FIG. 9).

Regardless of the thicknesses of workpieces A and B, dowel receiving holes Ah and Bh now match so that when workpieces A and B are connected with dowel D, edge Ae1 and surface Bs1 will be flush, and edges Ae2 and Be2 will be flush.

Figure 10A:
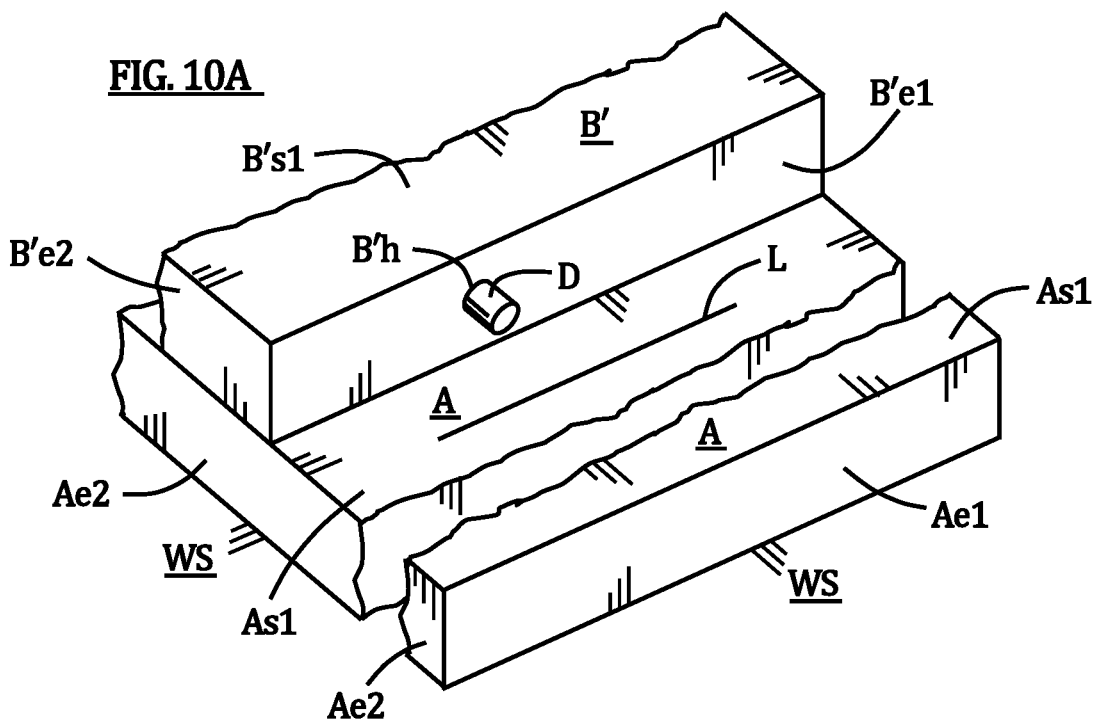
FIGS. 10A and 10B show the device used to create a second kind of edge-to-surface joint.
Figure 10B:
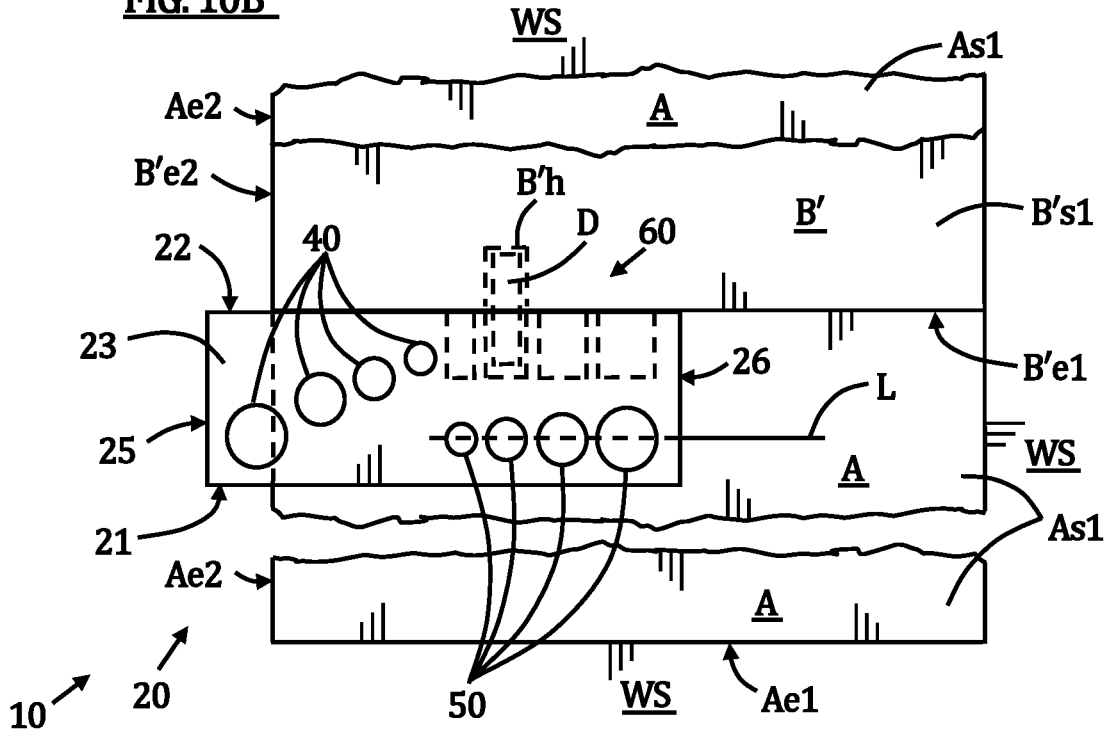

Referring now primarily to FIGS. 8A, 10A, and 10B, a user also may create a second kind of edge-to-surface joint with device 10 wherein a workpiece similar to workpiece B (designated B') is to be joined to surface As1 more distantly from edge Ae1 than workpiece B. Clamps may be used as needed to secure workpieces A and B', as well as device 10, temporarily in desired positions while continuing with these steps:

6. Replace workpiece B (seen in FIG. 9) with workpiece B'. Without repositioning workpiece A or device 10, drill into edge B'e1 through the selected bore 30 used in step 5 above, thereby creating dowel receiving hole B'h.
7. Draw line L on surface As1 indicating where dowel receiving hole Ah (not seen in FIG. 10A or 10B) needs to be drilled (with respect to edge Ae1) to match dowel receiving hole B'h.
8. Insert dowel D into dowel receiving hole B'h. FIG. 10A shows the arrangement of workpieces A and B', and dowel D, at this stage.
9. Position device 10 so that top surface 23 faces upward and rear surface 22 abuts edge B'e1, and so that dowel D is received in a bore 60 that is roughly the diameter of dowel D.
10. Reposition device 10 and workpiece B' as a unit so that guide line 27 and 28 (not seen in FIG. 10A or 10B) align with line L, and so that edge B'e2 is flush with edge Ae2. FIG. 10B is a top elevation that shows the arrangement of workpieces A and B', dowel D, and device 10 at this stage.
11. Drill into surface As1 through a selected bore 50 that aligns with dowel D, thereby creating dowel receiving hole Ah.

Regardless of the thicknesses of workpieces A and B', dowel receiving holes Ah and B'h now match so that when workpieces A and B' are connected with dowel D, edge B'e1 will abut surface As1 at the desired position, and edges Ae2 and B'e2 will be flush.

Creating Edge-to-Edge Joints

Figure 11:
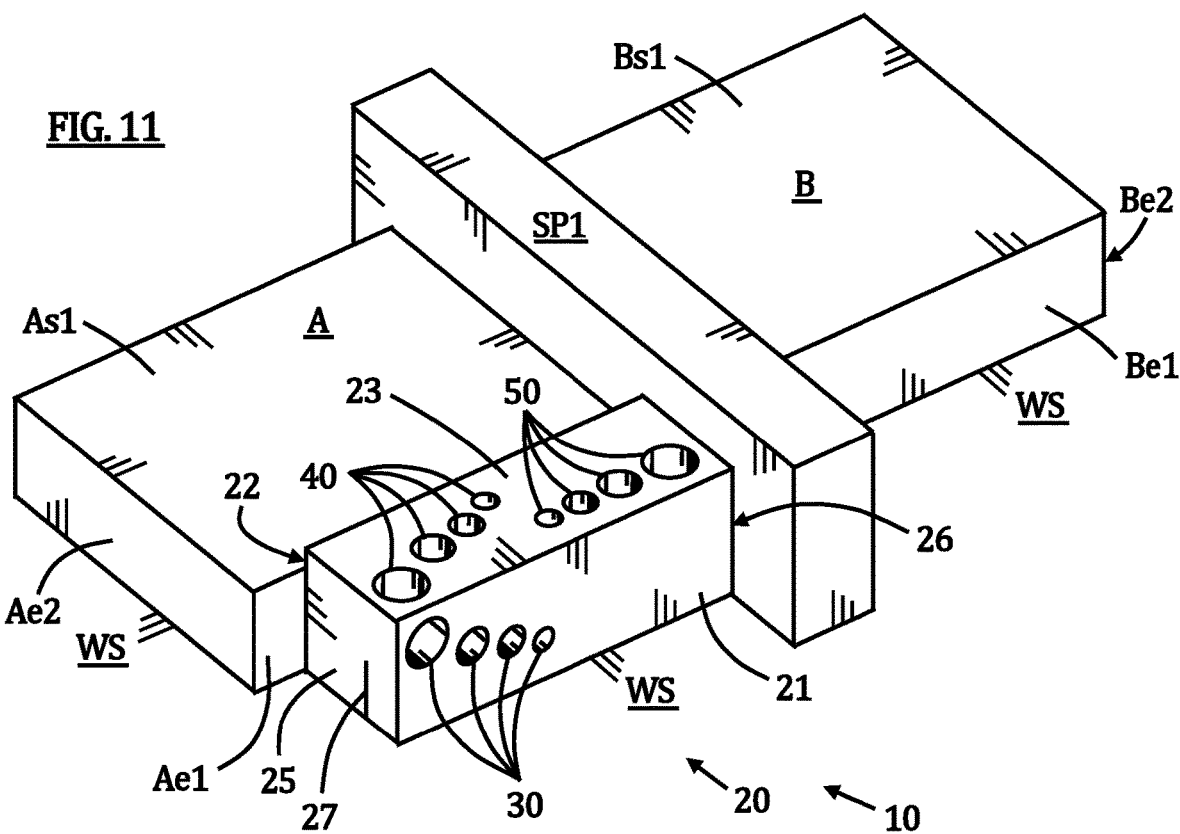
FIG. 11 shows the device used to create an edge-to-edge joint.

Referring now to FIGS. 8B and 11, a user may create edge-to-edge joints with device 10. Clamps may be used as needed to secure workpieces A and B, as well as device 10, temporarily in desired positions while following these steps:

1. Place workpiece A on work surface WS so that surface As1 faces upward, edge Ae1 faces frontward, and edge Ae2 faces leftward. Then place workpiece B beside workpiece A on work surface WS so that surface Bs1 faces upward, edge Be1 faces frontward, and edge Be2 faces rightward.
2. Place scrap piece SP1 on work surface WS between and abutting workpieces A and B.
3. Place device 10 on work surface WS so that right surface 26 abuts scrap piece SP1, rear surface 22 abuts edge Ae1, and top surface 23 faces upward. FIG. 11 shows the arrangement of workpieces A and B, scrap piece SP1, and device 10 at this stage.
4. Drill through a selected bore 30 into edge Ae1 to create dowel receiving hole Ah (not seen in FIG. 11).
5. Rotate device 10 180 degrees in the horizontal plane, and then place it on work surface WS so that right surface 26 abuts scrap piece SP1, front surface 21 abuts edge Be1, and top surface 23 faces upward.
6. Drill through the selected bore 30 (used in step 4) into edge Be1 to create dowel receiving hole Bh (not seen in FIG. 11).

To drill dowel receiving holes at other locations in edges Ae1 and Be1, a user may reorient device 10, or use additional scrap pieces to separate device 10 further from scrap piece SP1.

Regardless of the thicknesses of workpieces A and B, dowel receiving holes Ah and Bh now match so that when workpieces A and B are connected with dowel D (not seen in FIG. 11), edges Ae1 and Be1 will abut, surfaces As1 and Bs1 will be flush, and edges Ae2 and Be2 will be flush.

Creating Surface-to-Surface Joints

Figure 12:
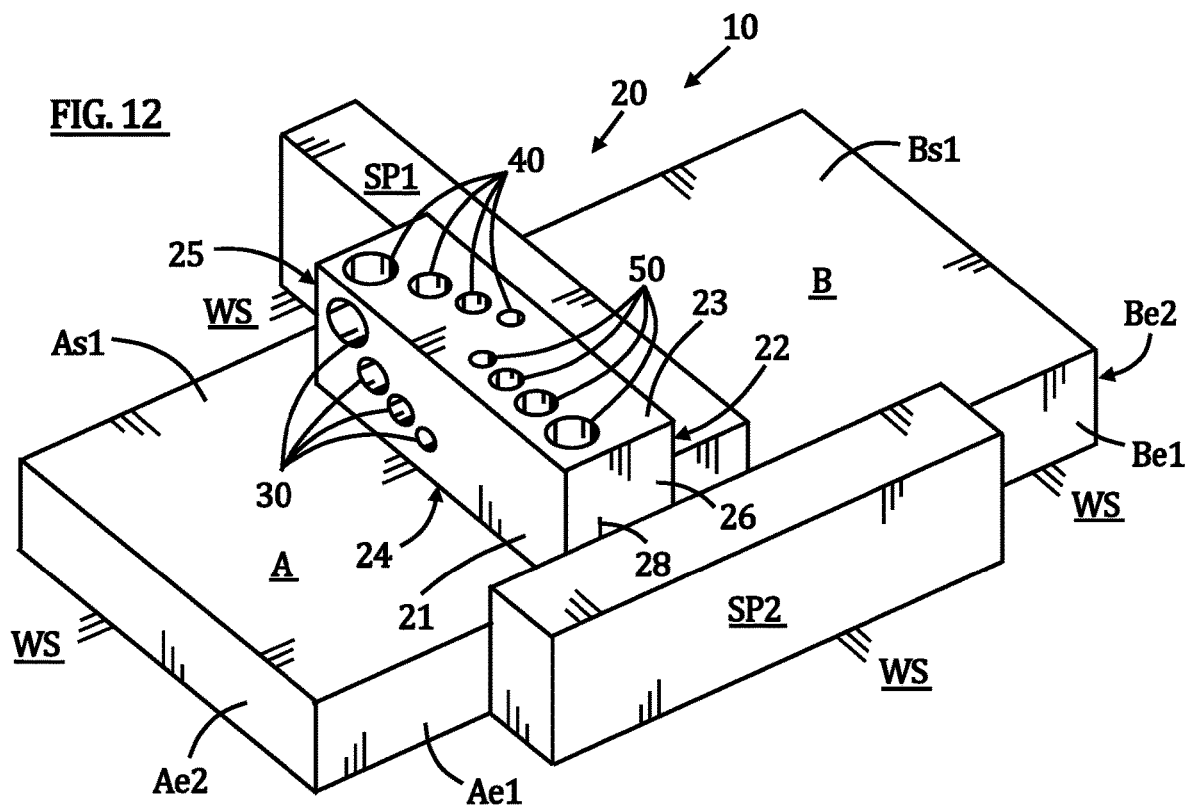
FIG. 12 shows the device used to create a surface-to-surface joint.

Referring now to FIGS. 8C and 12, a user may create surface-to-surface joints with device 10. Clamps may be used as needed to secure workpieces A and B, as well as device 10, temporarily in desired positions while following these steps:

1. Place workpiece A on work surface WS so that surface As1 faces upward, edge Ae1 faces frontward, and edge Ae2 faces leftward. Then place workpiece B on work surface WS beside workpiece A so that surface Bs1 faces upward, edge Be1 faces frontward, and edge Be2 faces rightward.
2. Place scrap piece SP1 on work surface WS between and abutting workpieces A and B.
3. Place a second scrap piece SP2 on work surface WS so that it abuts edges Ae1 and Be1.
4. Place device 10 on workpiece A so that rear surface 22 abuts scrap piece SP1, right surface 26 abuts scrap piece SP2, and top surface 23 faces upward. FIG. 12 shows the arrangement of workpieces A and B, scrap pieces SP1 and SP2, and device 10 at this stage.
5. Drill through a selected bore 40 into surface As1 to create dowel receiving hole Ah (not seen in FIG. 12).
6. Rotate device 10 90 degrees about its longitudinal axis so that front surface 21 faces upward. Then place device 10 on workpiece B so that bottom surface 24 abuts scrap piece SP1 and right surface 26 abuts scrap piece SP2.
7. Through the bore 30 that intersects the bore 40 used in step 5, drill into surface Bs1 to create dowel receiving hole Bh (not seen in FIG. 12).

To drill dowel receiving holes at other locations on surfaces As1 and Bs1, a user may reorient device 10, or use additional scrap pieces to separate device 10 further from scrap pieces SP1 and SP2.

Dowel receiving holes Ah and Bh now match so that when workpieces A and B are connected with dowel D (not seen in FIG. 12), surfaces As1 and Bs1 will abut, edges Ae1 and Be1 will be flush, and edges Ae2 and Be2 will be flush.

Various details of the present invention may be changed without departing from its scope. Furthermore, the foregoing description is for the purpose of illustration only, and not for the purpose of limitation.

What is claimed is:

1. A doweling jig for aligning a drill bit with respect to a pair of workpieces so that dowel receiving holes can be drilled at precise locations to create edge-to-edge joints, edge-to-surface joints, and surface-to-surface joints making use of concealed dowels, said doweling jig comprising:
    a) a body being generally cuboidal in shape, said body comprising three pairs of generally parallel surfaces: top and bottom, front and rear, and left and right; and
    b) a plurality of bores formed in said body, said bores having a plurality of diameters, said bores being generally cylindrical, each of said bores being generally perpendicular to one of said pairs of generally parallel surfaces, said bores further comprising:
        i) first bores which extend between, and are generally perpendicular to, said front surface and said rear surface, said first bores being generally parallel to one another, said first bores having a plurality of diameters, the positions of said first bores depending on their diameters such that the center axis of a relatively large said first bore is more distant from said bottom surface than the center axis of a relatively small said first bore; and
        ii) second bores which extend between, and are generally perpendicular to, said top surface and said bottom surface, said second bores being generally parallel to one another, said second bores having a plurality of diameters, each of said second bores having a diameter essentially equal to the diameter of one of said first bores, the positions of said second bores depending on their diameters such that the center axis of a relatively large said second bore is more distant from said rear surface than the center axis of a relatively small said second bore, the center axis of each of said second bores intersecting at 90 degrees the center axis of a said first bore of essentially equal diameter; and
        iii) third bores which extend between, and are generally perpendicular to, said top surface and said bottom surface, said third bores being generally parallel to one another, said third bores having a plurality of diameters, each of said third bores having a diameter essentially equal to the diameter of one of said first bores, the center axes of said third bores being colinear; and
        iv) fourth bores which extend from said rear surface toward, but not reaching, said front surface, said fourth bores being generally parallel to one another and generally perpendicular to said front and rear surfaces, said fourth bores having a plurality of diameters, each of said fourth bores having a diameter roughly equal to the diameter of one of said first bores, the positions of said fourth bores depending on their diameters such that the center axis of a relatively large said fourth bore is more distant from said bottom surface than the center axis of a relatively small said fourth bore, the center axis of each of said fourth bores, if extended to said front surface, intersecting at 90 degrees the center axis of a said third bore of roughly equal diameter.

2. The doweling jig as set forth in claim 1, wherein the diameter of each of said first bores, said second bores, and said third bores is approximately equal to the diameter of one of a plurality of standard-sized construction dowels.

3. The doweling jig as set forth in claim 1, wherein the diameter of each of said fourth bores is roughly equal to, but measurably larger than, the diameter of one of a plurality of standard-sized construction dowels.

4. The doweling jig as set forth in claim 1, wherein the center axes of said third bores are equidistant from said front surface.

5. The doweling jig as set forth in claim 1, wherein a said first bore and an intersecting said second bore have center axes that are essentially equidistant from said bottom surface and said rear surface, respectively.

6. The doweling jig as set forth in claim 5, wherein the distance of the center axis of a said first bore from said bottom surface, and the essentially equal distance of the center axis of an intersecting said second bore from said rear surface, are approximately equal to one-half the thickness of one of a plurality of standard-sized workpieces.

7. The doweling jig as set forth in claim 1, wherein the distance of the center axis of a said fourth bore from said bottom surface is essentially equal to the distance of the center axis of a said first bore of roughly equal diameter from said bottom surface.

8. The doweling jig as set forth in claim 1, wherein said body includes guide lines formed on said left and right surfaces, said guide lines aligning with the center axes of said third bores.

9. The doweling jig as set forth in claim 1, wherein said fourth bores extend from said rear surface toward said front surface, but do not reach said third bores.

10. The doweling jig as set forth in claim 1, wherein said body is formed from a single piece of material.

* * * * *